L. J. SUMMERLIN.
CULTIVATOR ATTACHMENT.
APPLICATION FILED SEPT. 29, 1921.
1,419,477.
Patented June 13, 1922.
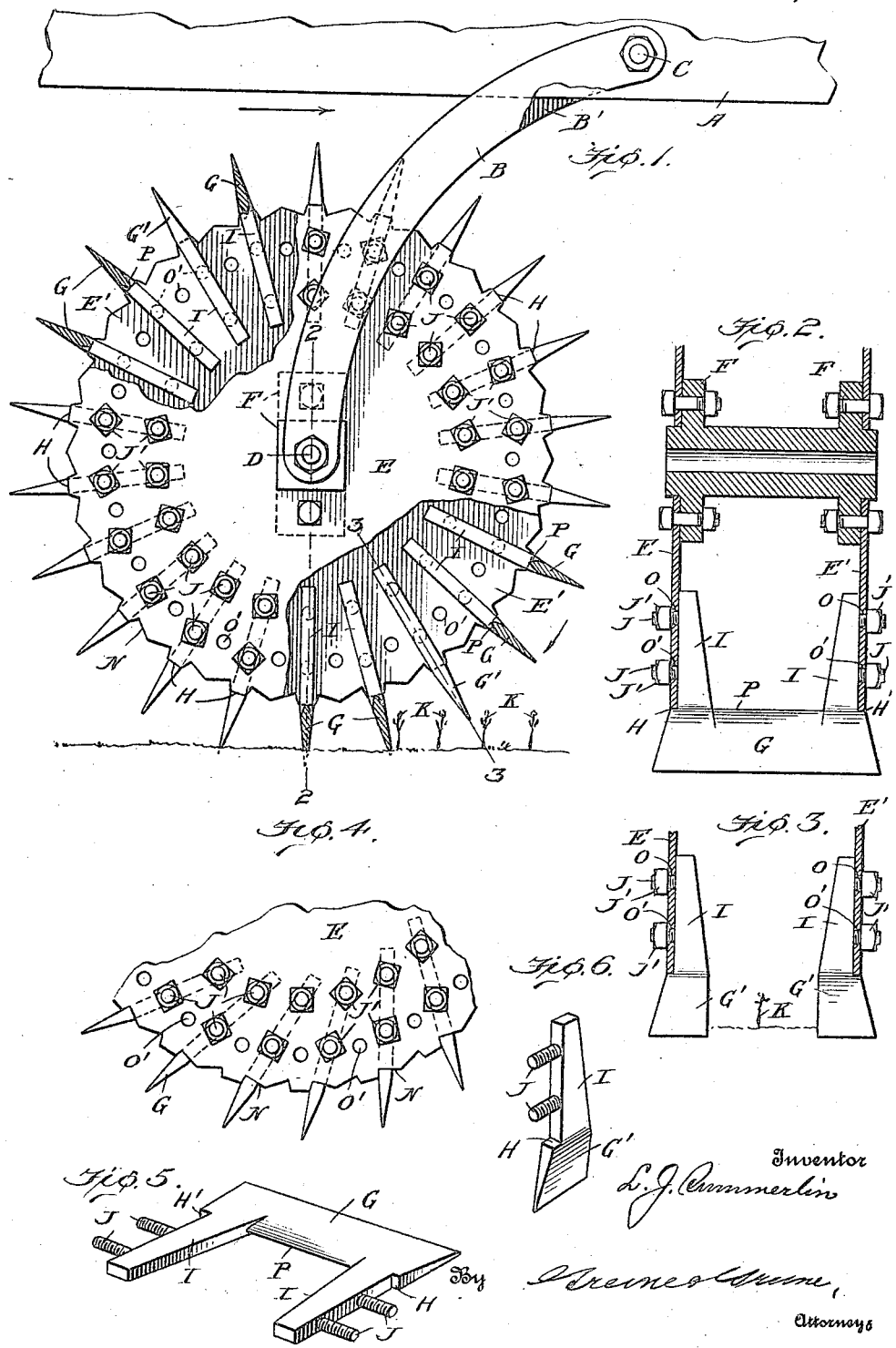

UNITED STATES PATENT OFFICE.

LAZARUS J. SUMMERLIN, OF CLEM, GEORGIA.

CULTIVATOR ATTACHMENT.

1,419,477.

Specification of Letters Patent. Patented June 13, 1922.

Application filed September 29, 1921. Serial No. 504,059.

*To all whom it may concern:*

Be it known that I, LAZARUS J. SUMMERLIN, a citizen of the United States, and resident of Clem, in the county of Carroll and State of Georgia, have invented certain new and useful Improvements in Cultivator Attachments, of which the following is a specification, reference being had therein to the accompanying drawing.

This invention relates to cultivator attachments, and the complete attachment is adapted to serve as a cotton chopper, fender, stalk cutter, and surface soil stirrer acting in close proximity to small plants. The devices are adapted to be detachably connected to any ordinary cultivator or to a so-called cotton plow, or the like, whether the cultivator operates on a single row of plants or on more than one row. The construction may be greatly varied, but for illustration a somewhat simple construction has been chosen.

In the accompanying drawings,—

Fig. 1 is a side elevation of the apparatus as attached to a nearly horizontal cultivator beam which may belong to a primitive or to the most modern type of cultivator.

Fig. 2 is a section on the line 2—2, Fig. 1.

Fig. 3 is a section on the line 3—3, Fig. 1.

Fig. 4 shows a part of the devices seen in Fig. 1 but with certain knives differently adjusted.

Fig. 5 is a perspective view of one of certain main knives.

Fig. 6 is a like view of a modified knife, or two short knives left by removing the middle portion of a main knife.

In these figures, A designates a portion of an ordinary cultivator beam or shovel plow beam, B, B' are a pair of curved arms pivoted at C to said beam and depending therefrom to support a shaft D carrying a hub F to opposite ends of which are secured equal, parallel spaced disks E, E', which may be removed and which are like terminal flanges on the hub. Transverse peripheral knives G are rigidly but detachably fixed to the disks with their outer edges at some distance outside the margins of the disks, and at a short distance from each other. As shown in this instance, the knives have shoulders H, H' at the edges of the disks, and each has arms I of any suitable form, here shown as inwardly tapered portions of the knife plates, fitting between the disks. In this particular form of construction, the disks are clamped against the intervening knives by threaded bolt-like rods J, projecting from the ends of the knives through holes in the disks, and nuts J'. At suitable angular intervals one of the main knives has its central portion removed or the main knife is replaced by two shorter knives G' such as would be left by removing such middle portion which normally lies between the arms I.

In operation, as the plow beam advances in the direction of the arrow, the weight of my devices presses the sharp edges of the knives into the ground, the main knives entering between plants in the row operated upon while the short knives enter the earth on each side of the row, the plants of which have been designated by K. As the disks rotate, the main knives, commonly no more than an inch and a half apart, break, uproot, or otherwise destroy plants lying in such inch and a half spaces. The short knives G', however, loosen the soil on each side of the row but destroy no plants, since the latter lie approximately midway between the short knives of each pair.

Meantime, the cultivator, not shown, acts upon the earth between the rows and nearly opposite the lower portions of the disks, the latter thus serving as fenders protecting the plants from earth thrown over by the cultivator shovels.

It is plain that the knives, and to some extent the disks, divide roots, or the stalks of the preceding crop, so that they may not tear out plants when caught and pulled by the cultivator shovels.

Since all the knives are replaceable, a pair of short knives may replace any main knife, so that the spaces for plants left may be as frequent as desired in the particular case and may each be of any desired width.

It is also clear that the knives, which do not extend deeply into the soil, may without harm stir the surface in close proximity to all sides of the plants, as cultivator shovels cannot, and thus many small weeds are destroyed.

The disks are provided with two concentric annular series of holes, O, O' so located that a knife having its inner rod J, at each end of the knife, lying in one of the holes O may have its outer rod lying in the radially aligning hole O' or in the next hole O' in advance or in the rear of the radially aligning hole. All the knives being similarly adjusted, all may incline equally to the rear and so in rotating act much like a hoe, or all incline equally to the front and so drag over the plants to some extent as the disks rotate. These three adjustments secure very different action, practically, and one or the other may be desirable according to conditions of crop and soil.

Tapering the arms I, or otherwise adapting them to occupy little space between the disks, tends to reduce the tendency to clog, and making the inner edges P of the main knives somewhat sharp aids in securing this result.

Obviously, the devices are usable on crops of various kind, e. g. sugar beets or any analogous crop to be thinned in the rows.

What I claim is:

1. In devices of the class described, the combination with two rigidly connected rotary spaced disks adapted to roll along an intervening row of small plants, of transverse knives projecting beyond the margins of the disks, and means for adjusting the inclination of each knife with respect to a radial plane.

2. In apparatus of the class described, the combination with a cultivator-carried member arranged to rotate freely when moved along a plant row by the cultivator's advance and provided with transverse peripheral knives, of means for fixing the blades in radial planes, respectively, and means for fixing the knives in positions inclined to said places, respectively.

3. In apparatus of the class described, the combination with a cultivator-carried member arranged to rotate freely about a horizontal axis and provided with peripheral transverse knives projecting beyond the member in spaced relation, of means for securing the knives in divergent radial planes, and means for fixing each knife in either a forwardly or rearwardly inclined position with respect to the corresponding radial plane.

4. The combination with a cultivator-carried member arranged to rotate freely when moved along a plant row by the cultivator and provided with spaced sets of spaced peripheral blades extending across the plane of the row, and analogous blades interposed between said sets and adapted to enter the ground only alongside the row.

5. The combination with a cultivator-carried member arranged to rotate when moved along a plant row by the cultivator and provided with spaced earth-entering blades transverse to the line of advance and each pivoted to swing with respect to a radial plane, and means for locking each in adjusted position.

In testimony whereof I hereunto affix my signature.

LAZARUS J. SUMMERLIN.